Aug. 25, 1936. J. H. COHEN 2,052,527
COMBINED WINDSHIELD HEATER AND DEFROSTER
Filed Jan. 26, 1931 2 Sheets-Sheet 1
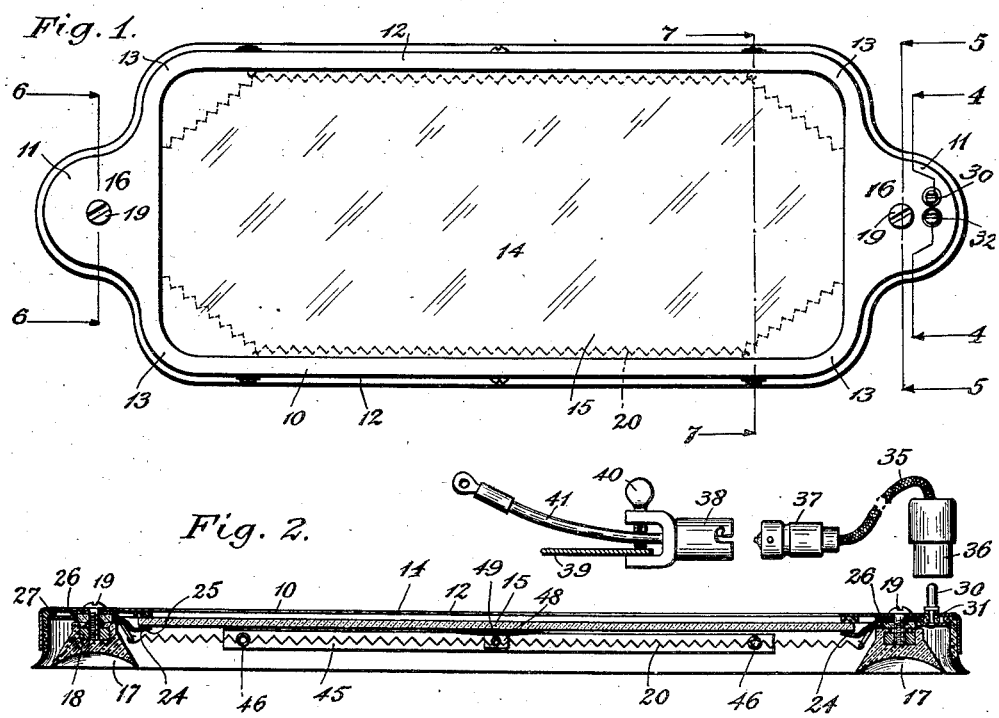
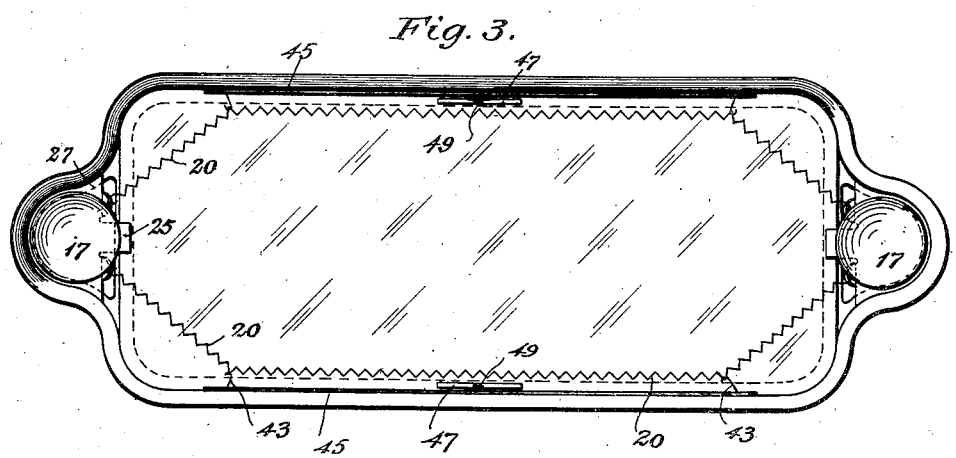
INVENTOR.
Joseph H. Cohen
BY
ATTORNEY Aug. 25, 1936.  J. H. COHEN  2,052,527
COMBINED WINDSHIELD HEATER AND DEFROSTER
Filed Jan. 26, 1931  2 Sheets—Sheet 2
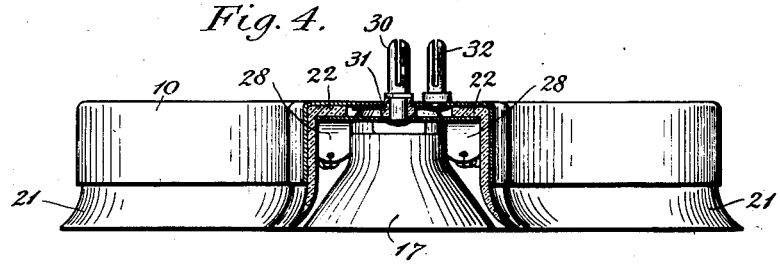
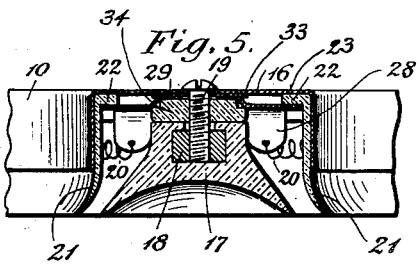 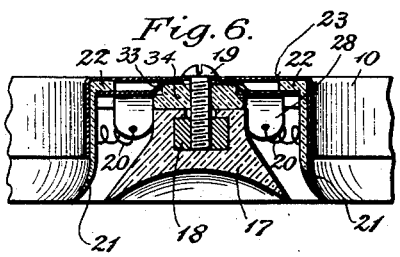
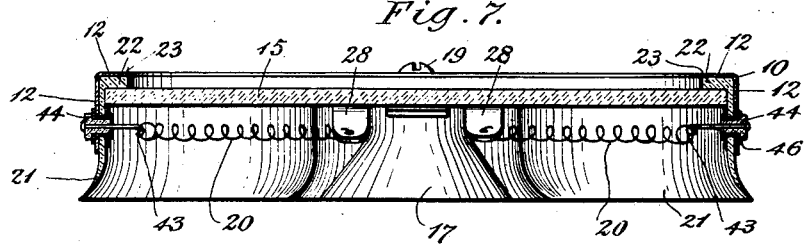
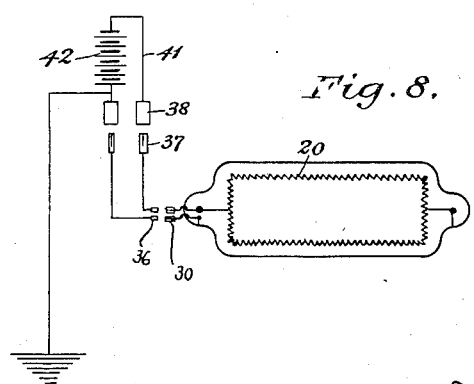
INVENTOR.
Joseph H. Cohen
BY
ATTORNEY Patented Aug. 25, 1936

2,052,527

UNITED STATES PATENT OFFICE 2,052,527

COMBINED WINDSHIELD HEATER AND DEFROSTER

Joseph H. Cohen, Bridgeport, Conn., assignor to Casco Products Corporation, Bridgeport, Conn., a corporation of Connecticut Application January 26, 1931, Serial No. 511,303

15 Claims. (Cl. 219—19)

This invention relates to frost preventers and heaters for windshields and other windows of motor vehicles.

An object of this invention is to provide a device of the type above referred to, which may be economically manufactured, and which is reliable and efficient in use.

One of the important features of this invention is the provision of a sheet metal frame having a window of glass or other suitable material, and within which a heating element is located to heat the air space between the windshield or the like and the window in the frame, and thereby raise the temperature of the windshield sufficiently to melt the sleet or snow which may freeze thereon, the frame having suction cups by means of which it may be held to the windshield in any desired position, as taught by my Patent No. 1,754,669, dated April 15, 1930.

So that the device may be used to prevent the condensation or moisture on the inside of the windshield, it is provided with a soft skirt of rubber or other like material which engages the surface of the windshield and occludes moisture from the portion of the windshield covered by the device.

Another feature of this invention is the provision of a separate detachable electrical connection between a current carrying receptacle and the combined windshield heater and defroster so that the device may be used as a defroster without the need of having the current supply wires dangling therefrom.

Other features and advantages will hereinafter appear.

In the accompanying drawings which illustrate one form of my invention, that at present preferred:

Figure 1 is a top plan view of the device of this invention.

Fig. 2 is a longitudinal sectional view showing the current carrying socket provided by the present invention and the current carrying connection which may extend between the socket and the combined windshield heater and defroster when the latter is used to heat the windshield.

Fig. 3 is a bottom plan view of the device of this invention.

Fig. 4 is an end view of the device of this invention partly in section, the section being taken approximately on the line 4—4 of Fig. 1.

Fig. 5 is a similar view but the section is taken on the line 5—5 of Fig. 1.

Fig. 6 is a similar view of the other end of the device taken on the line 6—6 of Fig. 1.

Fig. 7 is a transverse sectional view of the device of this invention taken on the line 7—7 of Fig. 1.

Fig. 8 is a diagrammatic view of the wiring system of the present invention.

As shown in the accompanying drawings, the device of the present invention comprises a frame 10 of metal which is substantially oblong in shape, except that at its ends it has semi-circular portions 11 connected with straight sides 12 by curved portions 13. The top of the frame is cut out to form a rectangular opening 14 behind which is located a glass pane 15, the semi-circular ends of the frame having top portions 16 under each of which is located a suction cup 17 by means of which the frame may be secured to the windshield or other window of a vehicle or the like in any desired position, in accordance with the teachings of my Patent No. 1,754,669, dated April 15, 1930, hereinbefore referred to.

The suction cups 17 preferably are of rubber, having threaded metal inserts 18 for engagement with screws 19 by means of which they are secured to the portions 16 of the frame. The suction cups 17 are so proportioned as to substantially space the glass pane 15 from the windshield or the like to provide a rather large space to be heated by one or more resistance elements 20 carried by the device and thereby heat the windshield or the like to melt sleet or snow or other moisture which may freeze thereon.

The sides 11, 12 and 13 of the frame 10 are sufficiently narrow as to not contact with the glass of the windshield or the like when the device is held thereon by the suction cups 17. To occlude moisture from the interior of the device so as to prevent condensation on the windshield, the space between the lower edges of the sides 11, 12 and 13 of the frame and the glass of the windshield or the like is closed by a skirt 21, preferably of soft rubber and also preferably tapered off in thickness toward the bottom so as to yield, and resiliently engage the glass of the windshield or the like.

This skirt may be secured to the frame 10 in any suitable way, but preferably, it extends upwardly parallel with the sides 11, 12 and 13, and then at right angles so as to form a ledge 22 interposed between the top flange 23 of the frame and the glass pane 15 of the device, and thus form an airtight connection between the frame and the pane of glass. The skirt is accordingly preferably molded to fit within the frame and to conform with the contour of the sides and ends thereof.

The pane of glass 15 is held in the frame in intimate contact with the ledge 22 of the skirt 21 by a pair of clips 24, one at each end of the frame. These clips, as will be seen from the drawings, each comprise an arm or lug 25 engaging the under side of the pane 15 and a central portion 26 interposed between the suction cup and the top 16 of the frame. In addition to this, the clip 24 has a marginal portion 27 fitting within the semi-circular end 11 of the frame and engaging the ledge 22 of the skirt 21 to hold the latter tightly to the frame at the ends thereof.

In addition to performing the function of holding the skirt and pane to the frame, the clips 24 also serve to carry the ends of the resistance element or elements 20, and for this purpose the clips are provided with arms 28 (see Figs. 4 to 7). These arms are perforated to receive a hook on the end of the resistance element or elements 20 to which they may be hard soldered, if desired. The arms 28 are in their resistance element carrying function rigid with the clips and may be made so since the resistance element is coiled and itself is sufficiently resilient to accommodate for expansion and contraction during heating and cooling.

In the form of the invention herein shown, current is carried to the resistance elements by means of these clips 24, and in view of this, the clip 24 at one side of the device (the right-hand side as viewed in Figs. 1 and 2) is insulated from the frame 10 by a washer 29 interposed between it and the frame, and this clip 24 is secured to it by contact pin 30 passing through the frame 10 and insulated therefrom by a resilient bushing 31 (see Fig. 4).

At the other end of the frame, the clip 24 is permitted to lie in direct metallic and good electrical contact with the top 16 of the frame which accordingly forms the return portion of the circuit. Current entering the device through the contact pin 30 following through the clip 24 connected therewith, then through the resistance elements 20 to the opposite clip 24, then to the frame 10 at any part of which it may be taken off. In the form shown, the frame 10 is secured to it, and contact pin 32 is adjacent the contact pin 30, but of course, the pin 32 may be located anywhere desired.

The clips 24 are provided with a dished central portion 33 in which the upper end of the hard fibre washer 34 extends to accurately locate the clip 24 without the latter's direct engagement with the securing screw 19 and the hard fibre washer being located between the clip 24 and the upper end of the suction cup 17.

Current is carried to the device when it is desired to use the latter to heat the windshield by a flexible cable 35 having connected at one end a socket 36 having apertures to detachably receive the pins 30 and 32, while the other end of the cable 35 is provided with a plug 37 adapted for insertion in a socket 38 which may be secured to the instrument-board 39 or other grounded part of the vehicle by a clamping screw 40; the socket 38 having a pig-tail or extension wire 41 for connection to an ammeter or some other part connected to the ungrounded side of the current supply battery 42 indicated in Fig. 8.

Heretofore, the separable electrical connection comprising the contact pins 30 and 32 and the socket 36 on the end of the supply cable 35 were not employed, and its provision by the present invention is an important feature thereof, for, according to the present invention, when the device is merely used to prevent condensation on the inside of the windshield, it is not necessary to have the current supply cable 35 dangling from the device. Yet, if it is desired to use the device to heat the windshield, it is a simple matter to attach the wire 35 to the device by means of a plug socket 36.

Of course, if desired, the resistance wires 20 may extend directly across the field of vision through the pane 15 without any disadvantage because a wire of such resistance that it does not glow may be employed. However, for appearance sake, the resistance elements 20 are caused to lie for the most part near the sides 12 of the frame, as shown in Fig. 1. This is done by providing hooks 43 supported by insulating blocks 44 in the sides 12 and caught into the convolutions of the helically wound resistance wire.

The portion of the skirt 21 which lies adjacent the sides 11, which in some cases may be very long, are held thereto by a flat plate 45 (see Figs. 2 and 3) and this may be held in place by tubular rivets 46, some of which also serve as guides for the insulating blocks 44 above referred to.

To support the pane intermediate its length, the present invention provides bracket 47 which engages the underside of the pane 15 and has an arm 48 bent at right angles thereto and threaded to be held in place to the side 12 of the arm by a screw 49 (see Figs. 1 and 2).

To apply the device of this invention to a windshield or other window of a vehicle or the like, it is merely necessary to moisten the edges of the suction cups 17 and press the frame at substantially the location of the screws 19 firmly against the windshield or the like in any desired position thereon which is convenient for the driver or other occupant of the car. It may be left thus so long as desired to keep moisture from condensing on the inside surface of the windshield, and should rain or snow become frozen on the outside of the windshield, the device may be connected to the source of current supply of the vehicle by the flexible cable 35 and the plug-socket 36.

Variations and modifications may be made within the scope of this invention, and portions of the improvements may be used without others.

Having thus described the invention, what is claimed as new and for which it is desired to obtain Letters Patent, is:—

1. A device of the kind described adapted to be secured to a windshield or the like and having a metal frame provided with an opening; a glass pane under the opening; a skirt of soft resilient material extending around the frame between side edges of the glass and side walls of the frame, and adapted to contact with the surface of the windshield; a flange on said skirt interposed between the frame and the glass pane and serving as a gasket to form an air-tight connection between the glass pane and the frame, and clips on the frame for supporting the glass pane in the frame and clamping the skirt flange between the pane and the frame.

2. A device of the kind described adapted to be secured to a windshield or the like and having a rigid frame including longitudinal sides and semi-circular ends of less diameter than the width of the frame between the ends and connected to the sides by curved portions, a narrow top flange on the horizontal sides, and top portions on the semi-circular ends and adjacent curved portions, said narrow top flanges of the sides and top portions of the ends defining a substantially rectangular top opening; a glass pane fitted under said opening, and clips on the frame for supporting the glass pane in the device by clamping it against the narrow top flange and top portions of the sides and ends respectively.

3. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; and spring arms on the frame for yieldingly forcing said glass pane against the narrow flanges.

4. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a heater wire; terminals on said frame; and clips located in said curved end portions for securing the pane to the frame under said opening and forming a bus bar for conducting electrical energy from said terminals to the heater wire.

5. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; a heater wire; terminals on said frame; and clips located in said end portions forming a bus bar for conducting electrical energy from said terminals to the heater wire, and other clips located on said longitudinal sides intermediate said end portions for securing the pane to the frame under said opening.

6. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; clips for holding said pane to the narrow flange portions of the frame and suction cups located in said end portions and secured thereto to hold the frame to a windshield or the like.

7. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; suction cups located in said end portions and secured thereto to hold the frame to a windshield or the like; and clips interposed between the suction cups and the frame for securing the glass pane to the frame under said opening.

8. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; suction cups located in said end portions and secured thereto to hold the frame to a windshield or the like; a heating element located in said frame under said pane; and clips on the frame for securing the glass pane to the frame under said opening and for carrying the ends of the heating element.

9. A device of the kind described adapted to be secured to a windshield or the like and having a rigid frame including straight longitudinal extending sides and reduced curved ends and a top having a substantially rectangular opening defined by narrow flanges on the longitudinal sides and top portions on the reduced curved ends; a glass pane fitted under said opening; suction cups located in said end portions and secured thereto to hold the frame to a windshield or the like; a heating element located in said frame under said pane; and clips interposed between the suction cups and the frame for securing the glass pane to the frame and for carrying the ends of the heating element.

10. A device of the class described adapted to be secured to a windshield or the like, including a frame having a top opening and end portions extending beyond the opening; a glass pane fitted under said opening; suction cups located in said end portions and secured thereto to hold the frame to a windshield or the like; a heating element located in said frame under said pane; and a plate interposed between each suction cup and the frame having an arm underlying the glass pane to secure the same to the frame under said opening and an arm for carrying an end of the heating element.

11. A device of the class described adapted to be secured to a windshield or the like, including a frame having a top opening and end portions extending beyond the opening; a glass pane fitted under said opening; suction cups located in said end portions and secured thereto to hold the frame to a windshield or the like; a heating element located in said frame under said pane; and a plate interposed between each suction cup and the frame having an arm underlying the glass pane to secure the same to the frame under said opening, an arm for carrying an end of the heating element, one of said plates being insulated from the frame and having an electric contact secured thereto and the other of said plates being in electrical engagement with the frame; and an electric contact carried by the frame.

12. In combination, a frame comprising a continuous metal band, a transparent sheet disposed entirely within said band near one edge thereof, a continuous rubber seal supported by said frame and forming a lining for the interior of said band, said seal having a continuous preformed inwardly projecting flange at one edge thereof coacting directly with the peripheral portion of said sheet and also having a continuous preformed outwardly directed sealing lip at its opposite edge projecting outwardly beyond the opposite edge of said band, and heating means carried by said band and spanning said frame.

13. In combination, a frame comprising a continuous metal band, a transparent sheet disposed entirely within said band near one edge thereof, a continuous rubber seal supported by said frame and forming a lining for the interior of said band, said seal having a continuous preformed inwardly projecting flange at one edge thereof coacting directly with the peripheral portion of said sheet and also having a continuous preformed outwardly directed sealing lip at its opposite edge projecting outwardly beyond the opposite edge of said band, said lining being pressed into intimate contact with said peripheral portion of said sheet, and heating means carried by said band and spanning said frame.

14. A windshield heater comprising a frame L-shaped in cross section, a transparent sheet disposed entirely within said frame near one edge thereof, a continuous rubber seal supported by said frame and forming a lining for the interior of the frame, said seal having a continuous preformed inwardly projecting flange at one edge thereof coacting directly with the marginal portion of said sheet and lying between the marginal portion of the sheet and the adjacent portion of said frame, said seal also having a continuous preformed outwardly directed flexible sealing lip at its opposite edge projecting outwardly beyond the opposite edge of the frame, and heating means carried by said frame and spanning the same.

15. A windshield heater comprising a frame L-shaped in cross section, a transparent sheet disposed entirely within said frame near one edge thereof, a continuous rubber seal supported by said frame and forming a lining for the interior of the frame, said seal having a continuous preformed inwardly projecting flange at one edge thereof coacting directly with the marginal portion of said sheet and lying between the marginal portion of the sheet and the adjacent portion of said frame, said seal also having a continuous preformed outwardly directed flexible sealing lip at its opposite edge projecting outwardly beyond the opposite edge of the frame, heating means carried by said frame and spanning the same, and suction cups carried by the frame in predetermined position relative to said sealing lip whereby the latter is flexed and held in intimate contact with the windshield when the suction cups are in frame-holding position on the windshield.

JOSEPH H. COHEN.